US010456806B2

(12) United States Patent
Chen et al.

(10) Patent No.: US 10,456,806 B2
(45) Date of Patent: Oct. 29, 2019

(54) LUMINESCENT APPLICATION AND REMOVAL TOOLS

(71) Applicant: PRC-DeSoto International, Inc., Sylmar, CA (US)

(72) Inventors: Wei Chen, Burbank, CA (US); Paul Lovik, Redmond, WA (US); James Enochs, Camarillo, CA (US); Ralph Roppo, Snohomish, WA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 632 days.

(21) Appl. No.: 14/780,098

(22) PCT Filed: Mar. 27, 2014

(86) PCT No.: PCT/US2014/031993
§ 371 (c)(1),
(2) Date: Sep. 25, 2015

(87) PCT Pub. No.: WO2014/160850
PCT Pub. Date: Oct. 2, 2014

(65) Prior Publication Data

US 2016/0045931 A1 Feb. 18, 2016

Related U.S. Application Data

(60) Provisional application No. 61/805,675, filed on Mar. 27, 2013.

(51) Int. Cl.
*B05C 17/00* (2006.01)
*B05C 17/10* (2006.01)
(Continued)

(52) U.S. Cl.
CPC ................ *B05C 17/10* (2013.01); *B05C 5/00* (2013.01); *B05C 21/00* (2013.01)

(58) Field of Classification Search
CPC .... B05C 1/00; B05C 3/00; B05C 5/00; B05C 7/00; B05C 9/00; B05C 11/00;
(Continued)

(56) References Cited

U.S. PATENT DOCUMENTS 3,840,015 A * 10/1974 Gain ...................... A61B 17/00 606/1
4,365,380 A * 12/1982 Fassler ...................... A46B 9/02 15/104.04
(Continued)

FOREIGN PATENT DOCUMENTS

WO WO 9826844 A1 * 6/1998 ............. A63H 33/18
WO 2010093490 A1 8/2010

OTHER PUBLICATIONS

Airbus Operations, AIPI, Airbus Process Instruction, "Sealing of Aircraft Structure", AIPI 05-05-001, Issue A2, Jun. 2002, pp. 1-41.
(Continued)

*Primary Examiner* — Michael D Jennings
(74) *Attorney, Agent, or Firm* — Alan G. Towner

(57) ABSTRACT

Luminescent tools for applying or removing sealants and adhesives are disclosed. The tools may be provided in the form of spatulas, scrapers, spreaders, smoothers and the like having surfaces that contact the sealant or adhesive material during application or removal. The tools or components thereof are made of load-bearing polymeric materials including a luminescent material. The luminescent tools may be seen and recovered when used in dark environments, such as during aircraft fabrication operations.

14 Claims, 5 Drawing Sheets

(51) Int. Cl.
*B05C 5/00* (2006.01)
*B05C 21/00* (2006.01)

(58) Field of Classification Search
CPC ......... B05C 17/00; B05C 19/00; B05C 21/00; B05C 17/10; C09K 11/00; C09K 11/01; C09K 11/02; C09K 11/06; C09K 11/07; C09K 11/08; H05B 33/20
USPC ....................................................... 15/236.01
See application file for complete search history.

(56) References Cited

U.S. PATENT DOCUMENTS

| | | | | | |
|---|---|---|---|---|---|
| 4,414,974 | A * | 11/1983 | Dotson | A61B 17/3213 30/162 |
| 5,490,437 | A * | 2/1996 | Hebert | B25G 1/01 81/22 |
| 5,588,560 | A * | 12/1996 | Benedict | B65D 35/38 222/106 |
| 6,207,077 | B1 * | 3/2001 | Burnell-Jones | C08J 5/043 252/301.36 |
| 6,375,864 | B1 * | 4/2002 | Phillips | C08K 3/02 252/301.33 |
| 2004/0078916 | A1 * | 4/2004 | Buchanan, Jr. | B60S 1/32 15/250.04 |
| 2004/0200980 | A1 | 10/2004 | Blackwell et al. | |
| 2007/0196627 | A1 | 8/2007 | Wang | |
| 2009/0110356 | A1 * | 4/2009 | Xiang | G02B 6/10 385/129 |
| 2013/0299742 | A1 | 11/2013 | Hamel et al. | |

OTHER PUBLICATIONS

Aero Consultants AG, elixair, "Safe System of Work for Sealant Removal", 20091103 Elixair SkyScraper System2_JK.doc, Apr. 11, 2009, pp. 1-8.
Elixair International, SkyScraper, Boeing Scraper, 2013, 6 pages.
www.glowzoneinc.com/consumerproducts.html, Mar. 10, 2014, 1 page.

* cited by examiner

LUMINESCENT APPLICATION AND REMOVAL TOOLS

FIELD OF THE INVENTION

The present invention relates to tools for applying and removing materials such as sealants, adhesives, coatings and lubricants, and more particularly relates to luminescent tools for such purposes.

BACKGROUND OF THE INVENTION

Materials such as sealants and adhesives are used for many applications, such as during the fabrication or repair of aircraft structures. Conventional sealant and adhesive application tools, or broken pieces thereof, are often dropped during use and can fall into areas where they are difficult to recover. For example, tools dropped into airplane wing sections during fuel tank sealing are very difficult to retrieve due to the geometry and lack of light in the wing structure. Sealant and adhesive tool retrieval from wings and other aircraft structures and foreign object debris prevention are on-going issues for aircraft manufacturers.

SUMMARY OF THE INVENTION

An aspect of the invention provides a luminescent tool for applying or removing a sealant or an adhesive comprising a surface structured and arranged to contact the sealant or adhesive, and a load-bearing portion comprising a polymeric material with a luminescent material disposed therein.

DETAILED DESCRIPTION OF EMBODIMENTS OF THE INVENTION

Figure 1:
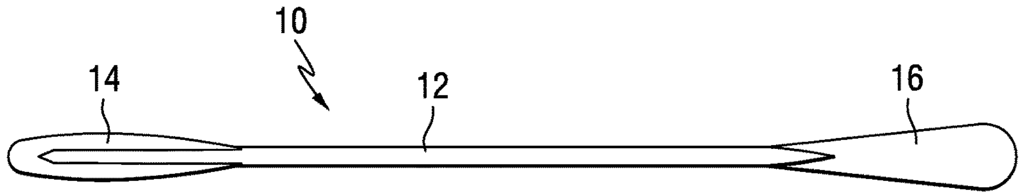
FIG. 1 is a front view and FIG. 2 is a side view of a luminescent spatula tool in accordance with an embodiment of the present invention.
Figure 2:
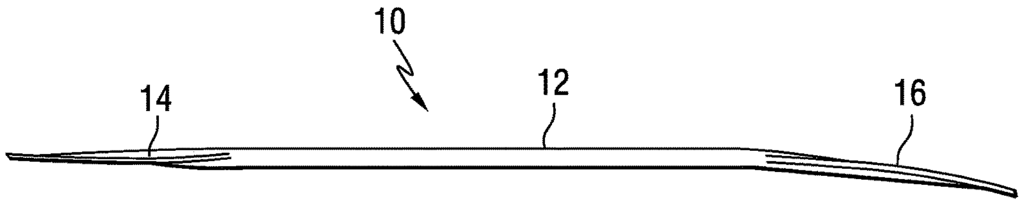

The present invention provides luminescent tools that may be seen and recovered when used in dark environments, such as during aircraft fabrication operations. Sealant and adhesive application tools, and other types of tools, can thus be more easily seen during use and retrieved from dark areas easily if accidentally dropped. The tools possess combinations of mechanical properties and glow retention power after initial charging.

The present tools may be made from any suitable polymeric material to which a luminescent material has been added. As used herein, the term “luminescent” means a material that emits light. The emitted light may be within the visible spectrum, i.e., wavelengths of from 400 to 700 nm. Alternatively, the emitted light may be in the near infrared (780-3,000 nm), mid infrared (3,000-50,000 nm) and/or far infrared (50,000-1,000,000 nm) spectrum(s). As understood by those skilled in the art, luminescence occurs without significant generation of heat, as opposed to incandescent light sources that generate heat. Furthermore, luminescence is different from reflectance because light is generated from the luminescent material rather than requiring a separate light source to generate reflected light. Emission of light is advantageous because it is not necessary to have a direct line of sight between a luminescent object and an observer in order to identify its location in a dark environment. A luminescent tool can light up an otherwise dark area, which may help in locating and recovering the tool. Any suitable type of known luminescent material may be used, for example, phosphorous-based fluorescent materials that emit light after they have been charged by previous exposure to light, chemoluminescent chemically reactive light-emitting liquids that emit light once they are combined together, photoluminescent materials, bioluminescent materials, electroluminescent materials, mechanoluminescent materials and the like.

As more fully described below, the luminescent tools or components thereof may be made from various types of polymeric materials having desired properties such as sufficiently high tensile strength, modulus, bending strength, wear resistance and surface lubrication. Such properties allow the luminescent tools to be used in load-bearing applications without breaking, bending an undesired amount, or otherwise failing due to the applied loads. In certain embodiments, the load-bearing tools are capable of withstanding significant bending loads experienced during the application or removal of sealants and adhesives.

In certain embodiments, the tools or components thereof may comprise from 70 to 99.99 weight percent of the polymeric material, and from 0.01 to 30 weight percent of the luminescent material. For example, the polymeric material may comprise from 85 to 99 weight percent and the luminescent material may comprise from 1 to 15 weight percent.

FIGS. 1-8 illustrate luminescent spatula tools in accordance with embodiments of the present invention. In the embodiment shown in FIGS. 1 and 2, the luminescent spatula 10 includes a generally cylindrical central handle portion 12, a first curved spatula end 14, and a second curved spatula end 16.

Figure 3:
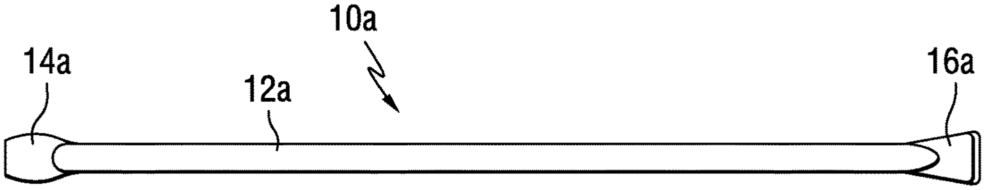
FIG. 3 is a front view and FIG. 4 is a side view of a luminescent spatula tool in accordance with another embodiment of the present invention.
Figure 4:
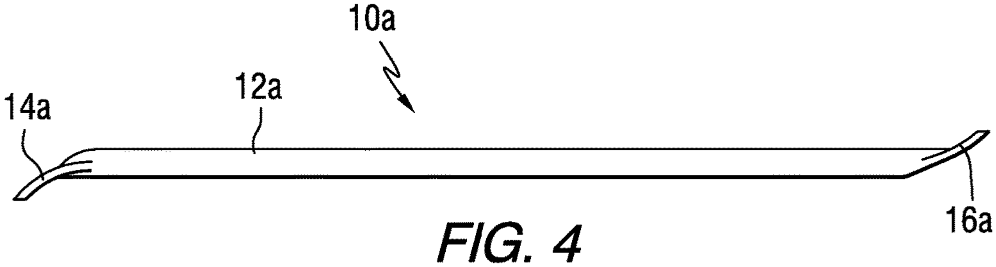

In the embodiment shown in FIGS. 3 and 4, the luminescent spatula **10*a* includes a generally cylindrical central handle portion 12*a*, a first curved spatula end 14*a*, and a second curved spatula end 16*a***.

Figure 5:
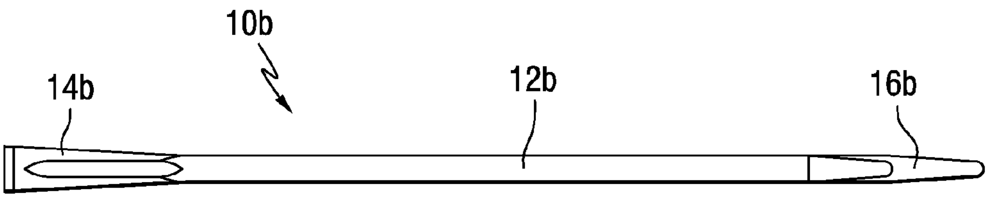
FIG. 5 is a front view and FIG. 6 is a side view of a luminescent spatula tool in accordance with a further embodiment of the present invention.
Figure 6:
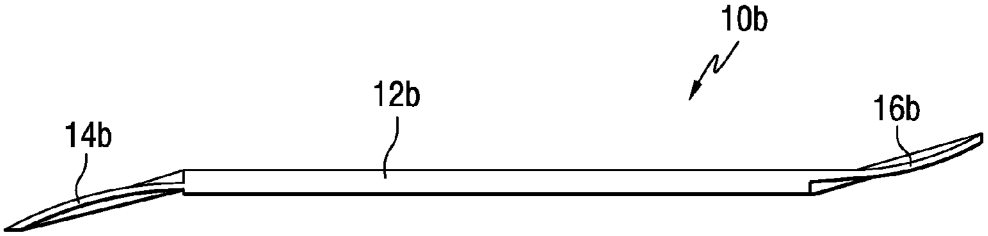

In the embodiment shown in FIGS. 5 and 6, the luminescent spatula 10*b* includes a generally cylindrical central handle portion 12*b*, a first curved spatula end 14*b*, and a second curved spatula end 16*b*.

Figure 7:
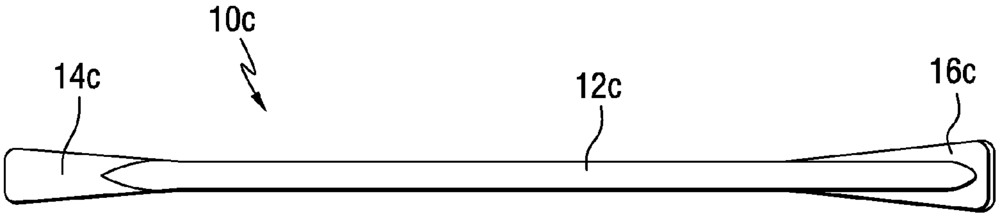
FIG. 7 is a front view and FIG. 8 is a side view of a luminescent spatula tool in accordance with another embodiment of the present invention.
Figure 8:
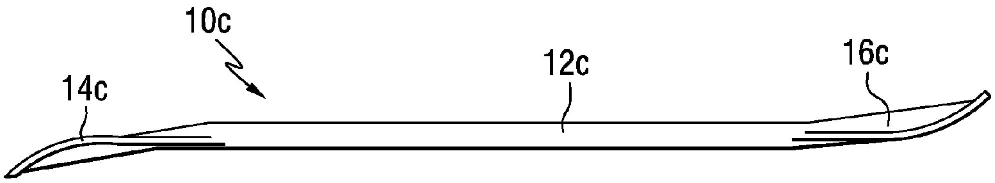

In the embodiment shown in FIGS. 7 and 8, the luminescent spatula 10*c* includes a generally cylindrical central handle portion 12*c*, a first curved spatula end 14*c*, and a second curved spatula end 16*c*.

The spatula tools illustrated in FIGS. 1-8 may be used to apply, form, shape, spread and/or remove materials such as adhesives and sealants typically used in aerospace and other industries. For example, the curved spatula ends 14, 14*a*, 14*b*, 14*c*, 16, 16*a*, 16*b* and 16*c* are structured and arranged to contact and apply or remove sealants or adhesives, and the luminescent polymeric material has sufficient strength and stiffness to withstand bending loads during such use. Variations of the tools described herein may be made in accordance with the present invention, including the provision of ergonomic handles, adaptations for use with electric and/or pneumatic power tools, and many modifications known to those skilled in the art.

The luminescent spatula tools shown in FIGS. 1-8 may be provided in any desired shapes and sizes, for example, with overall lengths typically ranging from 5 or 6 inches up to 10 or 12 inches, or more. The diameters or widths of the central handle rod portions 12, 12*a*, 12*b* and 12*c* may be of any desired size, for example, from 0.1 to 0.5 inch.

Figure 9:
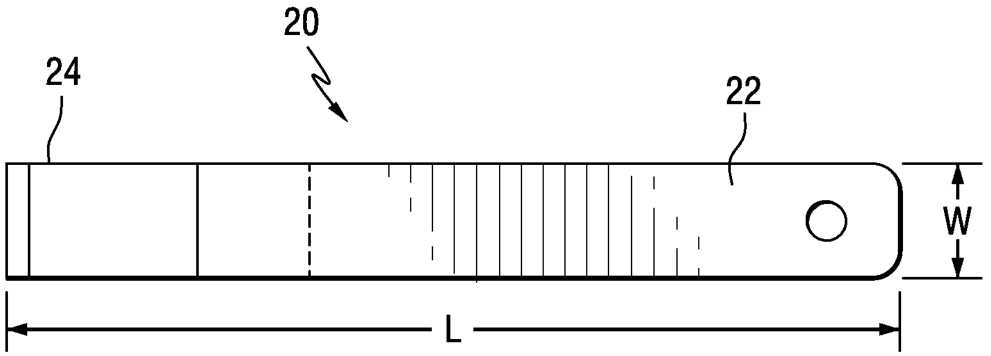
FIG. 9 is a front view and FIG. 10 is a side view of a luminescent scraper tool in accordance with an embodiment of the present invention.
Figure 10:

FIGS. 9 and 10 illustrate a luminescent scraper tool 20 in accordance with an embodiment of the present invention. The scraper tool 20 includes a handle end 22 and a tapered scraper end 24. As most clearly shown in FIG. 10, the tapered scraper end 24 tapers downward from its flat central region at a relatively shallow taper angle, with a steeper taper angle at the end forming a blade. The luminescent scraper tool 20 shown in FIGS. 9 and 10 may be used for various purposes such as sealant scraping and/or removal.

The luminescent scraper tool 20 shown in FIGS. 9 and 10 may have any desired shapes and dimensions. For example, the length L of the scraper tool 20 may typically range from 3 or 4 inches to 8 or 10 inches, or more. The width W of the luminescent scraper tool 20 may typically range from 0.2 or 0.3 inch to 10 or 12 inches, or more. The thickness T of the luminescent scraper tool 20 may typically range from 0.05 or 0.1 inch to 0.4 or 0.5 inch, or more.

Figure 11:
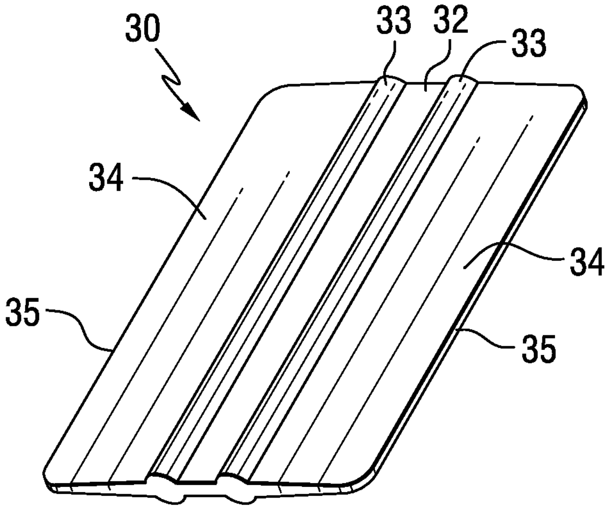
FIG. 11 is an isometric view of a luminescent spatula tool in accordance with an embodiment of the present invention.

FIG. 11 illustrates a luminescent smoothing and spreading tool 30 in accordance with another embodiment of the present invention. The smoothing and spreading tool 30 includes a central portion 32 located between raised ribs 33 extending along the length of the smoothing and spreading tool 30. Tapered wing portions 34 extend laterally from the raised ribs 33 and terminate in edges 35. The luminescent smoothing and spreading tool 30 shown in FIG. 11 may be used for adhesive and sealant surface smoothing and spreading.

The luminescent smoothing and spreading tool 30 may have any suitable shape dimensions. For example, the smoothing and spreading tool 30 may have a length of from 1 or 2 inches to 8 or 10 inches, or more. The smoothing and spreading tool 30 may have a width of from 1 or 2 inches to 6 or 8 inches, or more. The smoothing and spreading tool 30 may have a thickness at its central region of from 0.1 or 0.2 inch to 0.5 or 1 inch, and may have a thickness at its peripheral blade edges 35 of from 0.01 or 0.05 inch to 0.2 or 0.3 inch.

Figure 12:
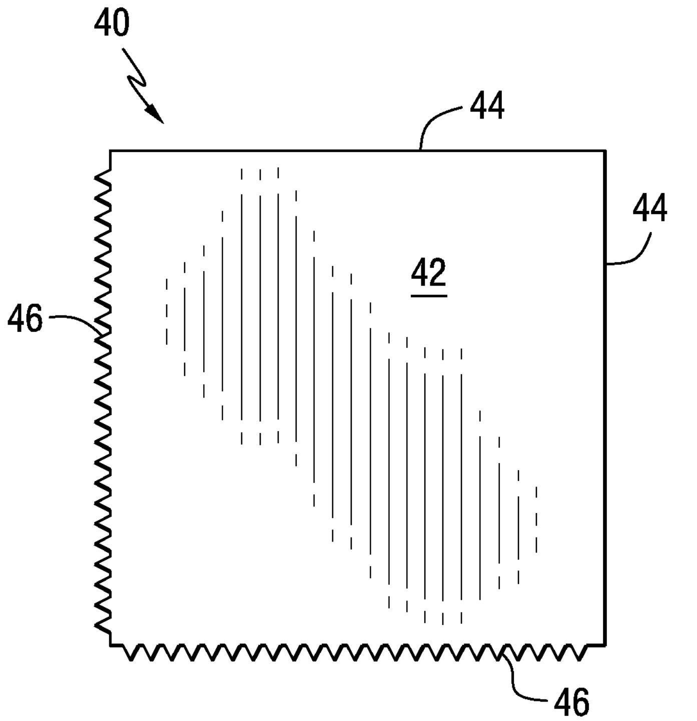
FIG. 12 is a front view and FIG. 13 is a side view of a luminescent spreader tool in accordance with an embodiment of the present invention.
Figure 13:
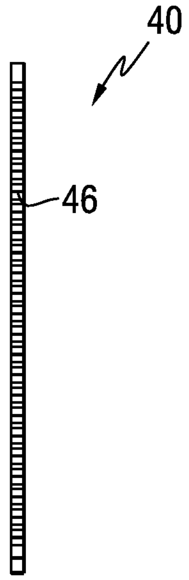

FIGS. 12 and 13 illustrate a luminescent smoothing and spreading tool 40 in accordance with an embodiment of the present invention. The smoothing and spreading tool 40 has a generally flat square shape and includes a central flat portion 42, two flat edges 44, and two serrated edges 46. The luminescent spreader tool 40 shown in FIGS. 12 and 13 may be used for spreading and surface smoothing of adhesives and sealants.

The shape and dimensions of the luminescent smoothing and spreading tool 40 may be selected as desired. For example, the smoothing and spreading tool 40 may have a typical thickness of from 0.02 or 0.03 inch to 0.1 or 0.2 inch, or more. The length and width of the smoothing and spreading tool 40 may typically range from 1 or 2 inches to 5 or 6 inches, or more. Although the smoothing and spreading tool 40 as shown in FIG. 12 has a generally square shape, other shapes may be used such as rectangular, triangular, circular and the like.

Figure 14:
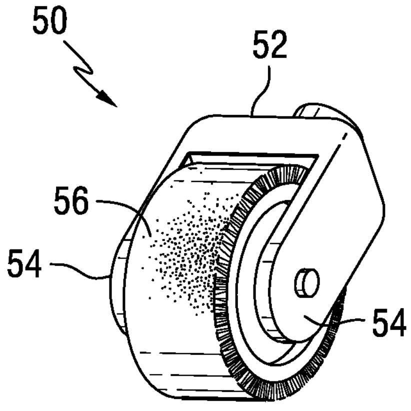
FIG. 14 is an isometric view of a luminescent roller brush tool in accordance with an embodiment of the present invention.

FIG. 14 illustrates a luminescent roller brush tool 50 in accordance with an embodiment of the present invention. The roller brush tool 50 includes a support bracket 52 having side arms 54 extending therefrom. A generally cylindrical brush 56 is rotatably mounted on the side arms 54. In accordance with an embodiment of the invention, the support bracket 52 and/or side arms 54 may be made of luminescent material. Alternatively, the cylindrical roller brush 56 may be made of a luminescent material. The luminescent roller brush tool 50 may be used for the application of adhesive and/or sealant to surfaces by rolling.

The luminescent roller brush tool 50 may have any desired shape and dimensions. For example, the outer diameter of the roller brush 56 may typically range from 0.1 or 0.2 inch to 3 or 4 inches, or more. The axial length of the roller brush 56 may typically range from 0.2 or 0.3 inch to 6 or 12 inches, or more.

Figure 15:
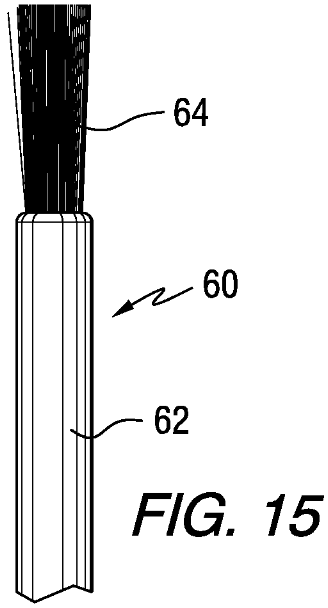
FIG. 15 is a side view of a luminescent brush tool in accordance with an embodiment of the present invention.

FIG. 15 illustrates a luminescent brush tool 60 in accordance with an embodiment of the present invention. The brush tool 60 includes a generally cylindrical handle 62 at one end, and brush bristles 64 extending therefrom at the other end. Many variations of brushes are known to those skilled in the art, and are within the scope of the present invention. In accordance with an embodiment of the present invention, the handle 62 may be made of a luminescent material. Alternatively, the brush bristles 64 may be made of a luminescent material. The luminescent brush 60 shown in FIG. 15 may be used for applying and smoothing sealants and adhesives.

The luminescent brush tool 60 may have any desired shape and dimensions. For example, the axial length of the handle 62 may typically range from 0.5 or 1 inch to 10 or 12 inches, or more. The diameter of the handle 62 may typically range from 0.2 or 0.3 inch to 0.5 or 1 inch, or more. The length of the brush bristles 64 may typically range from 0.1 or 0.2 inch to 5 or 10 inches, or more.

Figure 16:
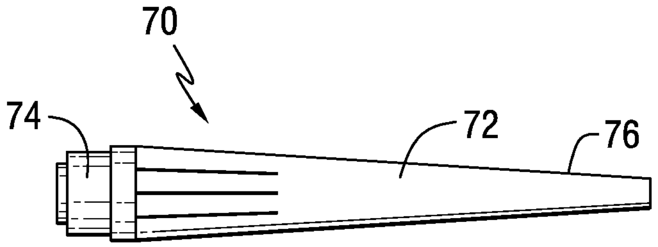
FIG. 16 is a side view of a luminescent nozzle tool in accordance with an embodiment of the present invention.

FIG. 16 illustrates a luminescent delivery nozzle 70 in accordance with an embodiment of the present invention. The delivery nozzle 70 includes a tubular hollow central portion 72, a threaded end portion 74, and a tapered outlet 76. The threaded ends 74 may be sized to fit various types of sealant- or adhesive-containing tubes, cartridges, lines, etc. The outlet opening 76 may also have any desired size and shape. For example, in addition to the tapered outlet end shown in the embodiment of FIG. 16, straight, flared or other outlet opening shapes may be used. The luminescent delivery nozzle 70 shown in FIG. 17 may be used to dispense sealants, adhesives and other types of viscous liquids.

The luminescent delivery nozzle 70 may be provided in any desired shapes and sizes. For example, the overall length of the delivery nozzle 70 may typically range from 0.3 or 0.5 inch to 12 or 15 inches, or more. The wall thickness of the central portion 72 of the delivery tube 70 may typically range from 0.01 or 0.05 inch to 0.2 or 0.3 inch.

Figure 17:
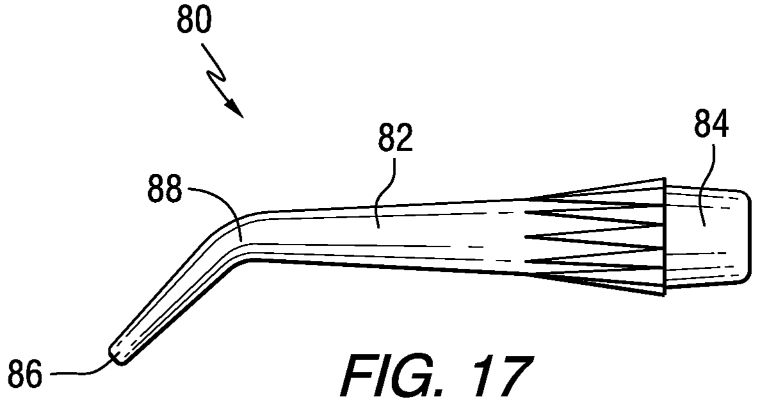
FIG. 17 is a side view of a luminescent bent nozzle tool in accordance with an embodiment of the present invention.

FIG. 17 illustrates a luminescent delivery nozzle 80 in accordance with an embodiment of the present invention. The delivery nozzle 80 includes a central hollow tubular section 82, a threaded end 84, and an outlet opening 86. The delivery nozzle 80 includes a bent portion 88 between the central portion 82 and the outlet opening 86. The dimensions and uses of the bent delivery nozzle 80 shown in FIG. 17 may be similar to those described in the embodiment shown in FIG. 16.

Figure 18:
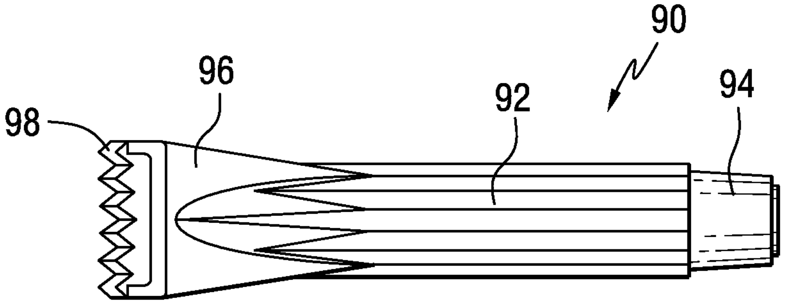
FIG. 18 is a side view of a luminescent nozzle tool in accordance with another embodiment of the present invention.

FIG. 18 illustrates a luminescent delivery nozzle 90 in accordance with an embodiment of the present invention. The delivery nozzle 90 includes a central tubular body portion 92, a threaded end 94 and a flared outlet 96. Serrated teeth 98 are provided at the end of the flared outlet 96. The dimensions and uses of the delivery nozzle 90 shown in FIG. 18 may be similar to those described in the embodiment shown in FIG. 16.

In certain embodiments, the luminescent tools may be made of thermoplastic or thermoset materials such as nylon (polyamide), acetal (POM), polypropylene, polyethylene, polyester, polyurethane, epoxy, phenolics and the like. In certain embodiments, the luminescent thermoplastic material is subjected to various loads and stresses during use, and should be capable of withstanding such loads without unwanted bending, breaking or otherwise failing. Load-bearing portions of the luminescent tools may include their handle portions and/or the portions that contact the adhesive or sealant during application or removal.

The particular polymeric material may possess sufficient mechanical properties such as tensile strength and tensile modulus that allow the tools to be used in load-bearing applications. For example, the polymeric material may have tensile strengths above 9,000 or 10,000 psi, or above 12,000 or 15,000 or 20,000 psi as well as a compressive strength above 9,000 or 10,000 psi, or above 12,000 or 15,000 or 20,000 psi. The luminescent thermoplastic materials may also have desired levels of stiffness, such as a tensile modulus above 3,000 MPa, or above 5,000 or 10,000 MPa as measured by the ISO 527-1/-2 standard test.

In certain embodiments, types of thermoplastics that may meet the above-noted properties may include nylon, acetal (POM), polyvinylidene fluoride (PVDF), polytetrafluoroethylene (PTFE), ethylene-chlorotrifluoroethylene (ECTFE), fluorinated ethylene propylene (FEP), polychlorotrifluoroethylene (PCTFE), perfluoroalkoxy (PFA), polyphenylene sulfide (PPS), polyetheretherketone (PEEK), polyethylene terephthalate (PET), polybutylene terephthalate (PBT), ultra high molecular weight polyethylene (UHMW-PE), high density polyethylene (HDPE), low density polyethylene (LDPE), polypropylene (PP), polymethylpentene (PMP), polysulfone (PSU), polyetherimide (PEI), polyethersulfone (PES), polyarylsulfone (PAS), polyarylethersulfone (PAES), polycarbonate (PC), polyphenylene oxide (Mod PPO), polyphenylene ether (Mod PPE), thermoplastic polyurethane (TPU), acrylic (PMMA), polystyrene (PS), acrylonitrile butadiene styrene (ABS), polyvinyl chloride (PVC), polyethylene terephthalate glycol (PETG), and cellulose acetate butyrate (CAB).

In certain embodiments the luminescent polymeric material may comprise at least one thermoset material. Examples of thermosets include epoxies, polyurethanes, polyesters, polyimides, urea-formaldehydes, phenol-formaldehydes, and polycyanurates.

The polymeric material may be reinforced with various reinforcing materials. Some examples of strength-enhancing additives include reinforcing glass fibers, glass beads, glass bubbles, carbon fibers, talc, silicon dioxide, aluminum oxide, titanium dioxide, calcium carbonate and the like. As a non-limiting example, nylon may be reinforced with glass fibers, glass beads, carbon fibers, and the like. For example, the nylon may be reinforced with from 5 percent to 60 percent glass fiber, e.g., 10 percent glass fiber, 20 percent glass fiber, 30 percent glass fiber, 40 percent glass fiber, 50 percent glass fiber, 60 percent glass fiber, etc. Specific types of nylon that may be used in accordance with embodiments of the present invention include unreinforced and reinforced Nylon 6, Nylon 46, Nylon 66, Nylon 66/6, and the like. The nylon may be used alone or as a blend, e.g., blended with other thermoplastics as listed below in any suitable ratio that provides the desired mechanical properties. An exemplary composition of a luminescent thermoplastic formulation in accordance with an embodiment of the invention is nylon type 6, 30% glass filled having a weight of 0.008130 kg with 0.001626 kg of phosphorus-based fluorescent material dispersed therein.

The present luminescent tools may be made by known techniques such as injection molding, compression molding, extrusion, 3D printing, and the like. In certain embodiments, the luminescent material may be uniformly dispersed throughout the thermoplastic material. In other embodiments, the luminescent material may be non-uniformly dispersed. For example, greater concentrations of the luminescent material may be provided at or near the exterior surface of the tool compared with the interior regions of the tool. Such graded loading of luminescent material near the surface of the tools may be achieved by methods such as co-extrusion of polymers having different loadings of the luminescent material, or by lining a mold with a polymer having a relatively high loading of luminescent material followed by injection or compression molding of a polymer having no luminescent material or a lower loading of luminescent material into the lined mold.

In accordance with embodiments of the present invention, the provision of luminescent tools may ensure that dropped tools, or pieces thereof, may be retrieved efficiently. When dropped into a dark area or enclosure, the light-emitting feature of the tool material allows recovery by either the line-of-sight glow or by reflected glow of the object within its surroundings. Furthermore, the luminescent tools may be easier to locate and to use in dark environments due to their ability to illuminate the areas immediately surrounding the tool. Users will be able to more easily use the tools and to retrieve dropped tools efficiently and rid of the quality issues and safety concerns.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A luminescent tool for applying or removing a sealant or an adhesive comprising:

at least one end comprising a surface structured and arranged to contact the sealant or adhesive, and a polymeric material with a luminescent material disposed therein; and a load-bearing portion comprising the polymeric material with the luminescent material disposed therein, wherein the luminescent tool comprises a spatula, scraper, spreader, or smoother;

the luminescent material comprises from 0.01 to 30 weight percent of the total weight of the polymeric material and the luminescent material;

the polymeric material has a tensile strength of greater than 10,000 psi;

the polymeric material has a modulus of greater than 5,000 MPa; and the polymeric material comprises a continuous matrix, and the luminescent material is dispersed in the continuous polymeric matrix.

2. The luminescent tool of claim 1, wherein the luminescent material is substantially uniformly dispersed in the polymeric matrix.

3. The luminescent tool of claim 1, wherein the luminescent material is non-uniformly dispersed in the polymeric matrix.

4. The luminescent tool of claim 3, wherein the luminescent material is present in a greater concentration at an outer surface of the luminescent tool than in an interior region of the luminescent tool.

5. The luminescent tool of claim 1, wherein the luminescent material comprises a photoluminescent material.

6. The luminescent tool of claim 1, wherein the luminescent material comprises from 1 to 15 weight percent of the total weight of the polymeric material and the luminescent material.

7. The luminescent tool of claim 1, wherein the polymeric material has a tensile strength of greater than 12,000 psi.

8. The luminescent tool of claim 1, wherein the polymeric material has a modulus of greater than 10,000 MPa.

9. The luminescent tool of claim 1, wherein the polymeric material comprises a thermoplastic.

10. The luminescent tool of claim 1, wherein the polymeric material comprises a polyamide, acetal, polypropylene, polyethylene, polyester, polyurethane, epoxy, phenolic or a combination thereof.

11. The luminescent tool of claim 1, wherein the polymeric material comprises reinforced nylon, acetal or a combination thereof.

12. The luminescent tool of claim 1, further comprising a reinforcement material dispersed in the polymeric material.

13. The luminescent tool of claim 12, wherein the reinforcement material comprises glass fibers, glass beads, glass bubbles, carbon fibers, talc, silicon dioxide, aluminum oxide, titanium dioxide, calcium carbonate or a combination thereof.

14. The luminescent tool of claim 1, wherein the luminescent tool comprises a spatula.

* * * * *